US007961443B2

(12) United States Patent
Pfingsten et al.

(10) Patent No.: US 7,961,443 B2
(45) Date of Patent: Jun. 14, 2011

(54) HYBRID POWER RELAY USING COMMUNICATIONS LINK

(75) Inventors: Thomas Robert Pfingsten, Winona, MN (US); Stanton Hopkins Breitlow, Winona, MN (US); John Frederic Lemke, Houston, MN (US); Keith Douglas Ness, Winona, MN (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 1083 days.

(21) Appl. No.: 11/784,454

(22) Filed: Apr. 6, 2007

(65) Prior Publication Data

US 2008/0250171 A1 Oct. 9, 2008

(51) Int. Cl.
*H02H 3/00* (2006.01)
*H02H 7/00* (2006.01)
*H01H 9/30* (2006.01)
*H01H 9/56* (2006.01)

(52) U.S. Cl. .................................. 361/2; 361/3; 361/14

(58) Field of Classification Search ...................... 361/2
See application file for complete search history.

(56) References Cited

U.S. PATENT DOCUMENTS 3,982,137 A 9/1976 Penrod
4,025,820 A 5/1977 Penrod
4,152,634 A 5/1979 Penrod
4,251,845 A 2/1981 Hancock
4,389,691 A 6/1983 Hancock
4,438,472 A 3/1984 Woodworth
4,445,183 A 4/1984 McCollum
4,525,762 A 6/1985 Norris
4,598,330 A 7/1986 Woodworth
4,618,906 A 10/1986 Paice et al.
4,754,360 A 6/1988 Nakada
4,760,483 A 7/1988 Kugelman et al.
4,767,944 A 8/1988 Takeuchi et al.
4,772,809 A 9/1988 Koga et al.
4,816,818 A 3/1989 Roller
4,939,776 A 7/1990 Bender
4,959,746 A 9/1990 Hongel
5,053,907 A 10/1991 Nishi et al.
5,081,558 A 1/1992 Mahler
5,519,370 A 5/1996 Perreira et al.
5,536,980 A 7/1996 Kawate et al.
5,629,824 A 5/1997 Rankin et al.
(Continued)

FOREIGN PATENT DOCUMENTS

EP 1655753 5/2006
(Continued)

OTHER PUBLICATIONS

International Search Report—WO 2008/124395.

*Primary Examiner* — Dharti H Patel
(74) *Attorney, Agent, or Firm* — Brinks Hofer Gilson & Lione

(57) ABSTRACT

A control circuit for controlling an arc suppression circuit includes a serial communication link communicating a serial signal therethrough. The control circuit includes a microprocessor having a serial input communicating with the serial communication link. The microprocessor generates a control output signal in response to the serial signal. The control circuit further includes the arc suppression circuit having an electrical contact and operating in response to the control output signal to reduce an arc at the electrical contact.

60 Claims, 3 Drawing Sheets

U.S. PATENT DOCUMENTS

| | | | |
|---|---|---|---|
| 5,652,688 A | 7/1997 | Lee | |
| 5,699,218 A | 12/1997 | Kadah | |
| 5,703,743 A | 12/1997 | Lee | |
| 5,790,354 A | 8/1998 | Altiti et al. | |
| 6,054,659 A | 4/2000 | Lee et al. | |
| 6,078,491 A | 6/2000 | Kern et al. | |
| 6,347,024 B1 * | 2/2002 | Blain et al. | 361/3 |
| 6,621,668 B1 | 9/2003 | Sare | |
| 6,624,989 B2 | 9/2003 | Brooks, Jr. | |
| 6,671,142 B2 | 12/2003 | Beckert et al. | |
| 6,741,435 B1 | 5/2004 | Cleveland | |
| 6,760,610 B2 * | 7/2004 | Tschupp et al. | 600/345 |
| 6,891,705 B2 | 5/2005 | Bryan | |
| 6,917,500 B2 | 7/2005 | Vail et al. | |
| 7,079,363 B2 | 7/2006 | Chung | |
| 7,110,225 B1 | 9/2006 | Hick | |
| 7,145,758 B2 | 12/2006 | King et al. | |
| 2004/0052012 A1 | 3/2004 | Boughton et al. | |
| 2004/0179313 A1 | 9/2004 | Cleveland | |
| 2005/0109115 A1 * | 5/2005 | Gatesman | 73/753 |
| 2006/0254365 A1 * | 11/2006 | Hamel | 73/778 |
| 2007/0014055 A1 | 1/2007 | Ness | |

FOREIGN PATENT DOCUMENTS

| | | |
|---|---|---|
| GB | 2185856 | 2/1987 |
| WO | 2004/032168 | 4/2004 |
| WO | 2007/014725 | 2/2007 |

* cited by examiner

HYBRID POWER RELAY USING COMMUNICATIONS LINK

TECHNICAL FIELD

The present disclosure relates generally to a relay and, more particularly, to a method for controlling hybrid power-switching device.

BACKGROUND

The statements in this section merely provide background information related to the present disclosure and may not constitute prior art.

Mechanical relays have several practical advantages over other types of power control. Because of the low ohmic resistance of metallic contacts, the on-state power dissipation of a relay is inherently low. One drawback to mechanical relays is the degradation of the contact material caused by electrical arcing as the contacts are made and broken. Breakdown of the contacts may cause the device to become inoperable.

Because solid-state switching devices must dissipate a significant amount of power, bulky and expensive heat dissipation devices must be employed.

Often times, arc suppression circuits use discrete circuitry to control the operation of the power-switching device. One drawback to this approach is that adjusting the circuit and the timing may not be performed. In certain conditions, it may be desirable to modify the operating characteristics of the arc suppression circuitry to adjust to various conditions.

Another example of an arc suppression circuit includes a microcontroller. The microcontroller has an input for controlling using discrete voltages is set forth. A microcontroller configuration is illustrated in U.S. Pat. No. 6,347,024.

It would, therefore, be desirable to control an arc suppression circuit to meet the needs of various conditions.

SUMMARY

The present disclosure uses a serial communication link to provide various types of information to a microprocessor. The microprocessor may be used to calculate various conditions based upon the input from the serial link.

In one aspect of the disclosure, a control circuit includes a serial communication link communicating a serial signal therethrough. The control circuit also includes a microprocessor having a serial input communicating with the serial communication link and generating a control output signal in response to the serial signal. The control circuit further includes an arc suppression circuit having an electrical contact and operating in response to the control output signal to reduce an arc at the electrical contact.

In another aspect of the disclosure, a method of operating an arc suppression circuit includes receiving a serial signal through a serial communication link, generating a control output signal in response to the serial signal and controlling the arc suppression circuit having an electrical contact with the control output signal to reduce an arc at the electrical contact.

Advantageously, the control circuit allows one configuration to be manufactured for a multitude of configurations and changing conditions. The microprocessor can easily be programmed to perform in various operating conditions based on various inputs from the serial communication link.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
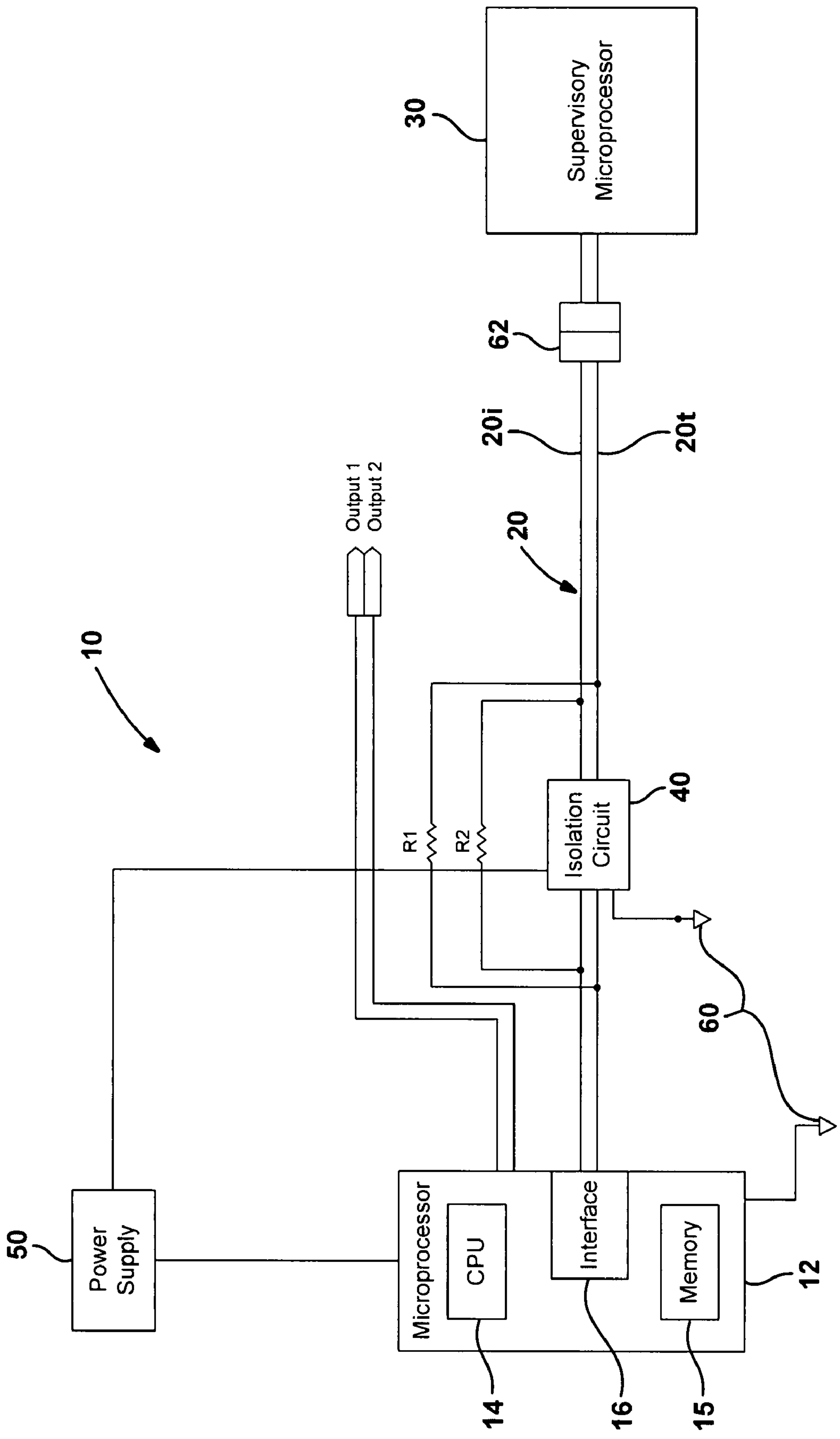
FIG. 1 is a schematic of a microprocessor generating an output from a serial input.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

Figure 2:
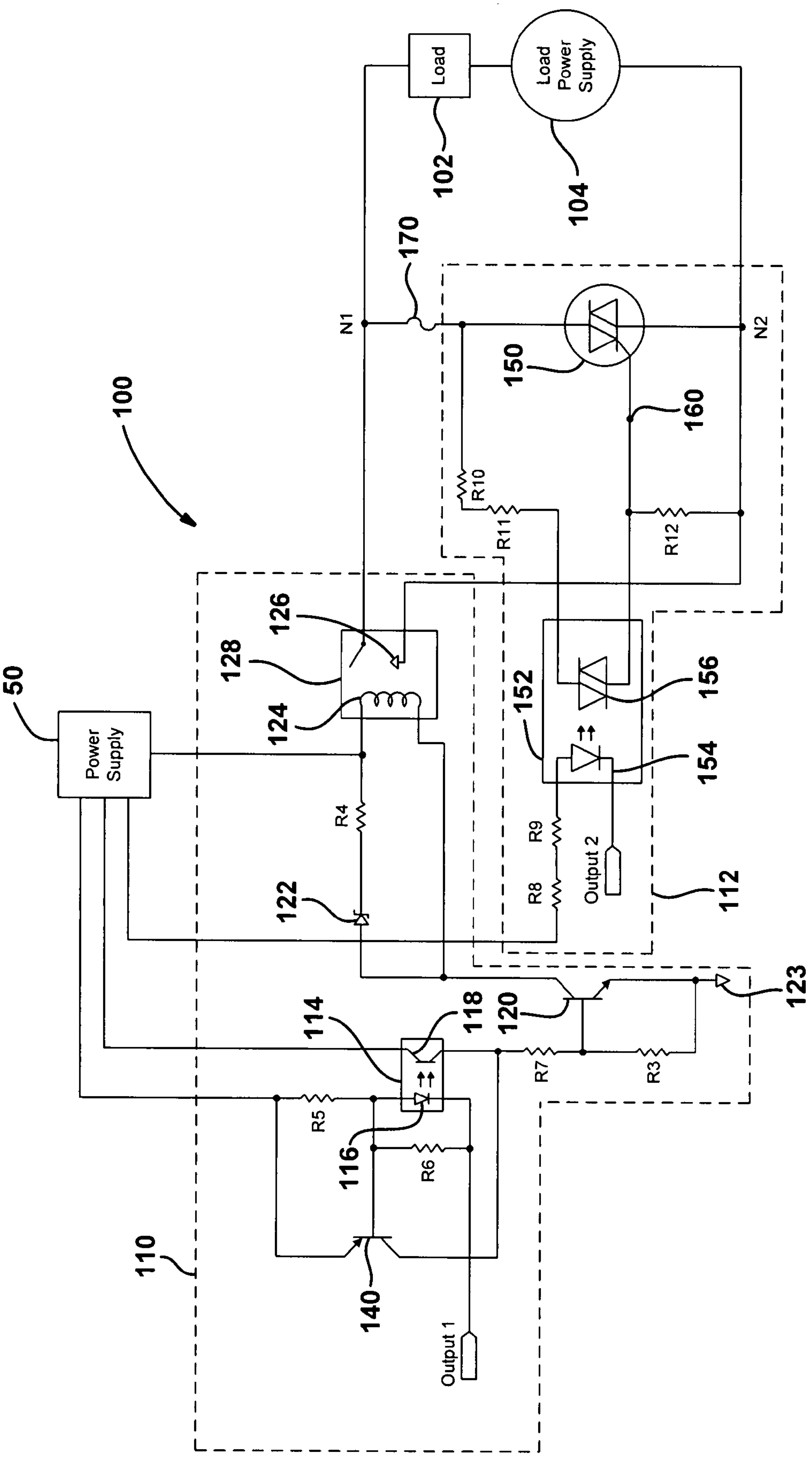
FIG. 2 is a schematic of an arc suppression circuit controlled in response to the output of FIG. 1.

Referring now to FIG. 1, a control circuit 10 used to control an arc suppression circuit shown in FIG. 2 is illustrated. The control circuit 10 includes a microprocessor 12 that is used to generate a first output, output 1, and a second output, output 2. The microprocessor 12 may also be referred to as a microcontroller or a controller. The microprocessor 12 may include a CPU 14 for performing various calculations and controlling the outputs based on various inputs. The microprocessor 12 also includes a memory 15 for storing various parameters and software for execution by the CPU 14.

The microprocessor 12 may also include an interface 16 in communication with a serial communication link 20. The interface 16 may include various types of interfaces, including, but not limited to, a universal asynchronous receiver transmitter (UART), a serial peripheral interface (SPI), control area network (CAN), Ethernet or an inter-integrated circuit ($I^2C$) interface. It should be noted that, although the interface 16 is illustrated within the microprocessor 12, the microprocessor 12 may not include the interface 16. Thus, the interface 16 may be a separate component outside of the microprocessor 12. Commonly, such interfaces are included in the microprocessor 12.

The serial communications link 20 communicates a serial signal therethrough. The serial signal includes serial digital information that may include parameter signals, algorithm selection signals, and a state signal corresponding to the state of an external circuit or a state of the arc suppression circuit desired by the external circuit. An external circuit such as a supervisory microprocessor 30 may be used to generate the serial signal. The external circuit may be located in a position other than with the microprocessor 12. The serial signal may, thus, correspond to parameters associated with the supervisory microprocessor 30 or the external circuit. The serial signal may also correspond to code for selecting a particular algorithm within the software of the microprocessor 12. Selection may be performed according to the needs or sensed conditions at the supervisory microprocessor 30 or other associated circuitry. The serial digital information signal may also correspond to a state of the supervisory microprocessor 30 or other external circuit.

The serial communication link 20 may include a one-way communication link or, as illustrated, a two-way communication link. The serial communication link 20 may be an asynchronous communication link or a synchronous communication link. The serial communication link in a two-way implementation may include an input link 20*i* and an output link 20*t*. The supervisory microprocessor 30 may be coupled directly to the interface 16 of the microprocessor 12 through the serial communication link 20. In such a case, resistors R1 and R2 may be utilized for the coupling.

The supervisory circuit 30 may also be isolated from the microprocessor 12. In such a case, a digital isolation circuit 40 may be used. The digital isolation circuit 40 may be a dual channel digital isolator for isolating the supervisory microprocessor 30 in both the receive and transmit directions from the microprocessor 12. The dual-channel digital isolation circuit 40 provides electrical isolation. The isolation circuit 40 may be an optical device or a digital device. One example of a suitable digital device is an Analog Device part number ADUM1201.

When isolating the supervisory microprocessor 30 from the microprocessor 12, the resistors R1 and R2 are not utilized. In a non-isolating configuration, the isolation circuit 40 is not used.

A power supply 50 may be coupled to the microprocessor 12 and the isolation circuit 40. The power supply 50 may provide power and may be capable of providing isolated power at various voltage levels, including 3.3 volts and 24 volts. The voltage output of the power supply 50 depends on the particular type of microprocessor and other components used. Both the microprocessor 12 and the isolation circuit 40 are coupled to a voltage reference 60.

The supervisory microprocessor 30 may be coupled to the microprocessor 12 through a connector 62. The connector 62 may represent a communication bus or a portion of a bus. The supervisory microprocessor 30 may be located at a different location than the microprocessor 12.

Referring now to FIG. 2, one example of an arc suppression circuit 100 coupled to a load 102 and a load power supply 104 is illustrated. The load 102 may be a high-power load. Other examples of arc suppression circuits are disclosed in U.S. Pat. No. 5,790,354, U.S. Pat. No. 6,347,024, and U.S. Publication 2007/0014055, the disclosures of which are incorporated by reference herein.

The arc suppression circuit 100 includes a mechanical relay control portion 110 and a solid-state control portion 112. The mechanical relay control portion 110 receives the output signal output 1 and is controlled thereby. The output 1 signal may be coupled directly to an electro-mechanical relay 128 or may be indirectly coupled using isolation circuitry.

In an isolation configuration, output 1 may be coupled to an optical isolation circuit 114. The optical isolation circuit 114 may include a light-emitting diode 116 and a phototransistor 118. The output 1 signal is coupled to the cathode of the light-emitting diode while the anode is coupled to the power supply 50. The control provided by output 1 energizes the light-emitting diode which emits light that is received by the phototransistor 118. The phototransistor 118 conducts in response to the light from the light-emitting diode 114. In response to current flow through the phototransistor 118, current flows through resistor R3 and the switching device 120 switches on and, thus, draws current from the power supply 110, at a high voltage, such as 24 volts through relay coil 124. The switching device 120 may include a transistor. A Schottky diode 122 may be disposed in the path between the coil 124 and the switch device 120 to provide a path to allow the magnetic field to collapse when the switching device is turned off. The resistor R3 may be coupled between the base of the transistor and a voltage reference 123. The emitter of the switching device 120 is coupled to the reference voltage 123. In this manner, the coil 124 of the electro-mechanical relay 128 conducts current through resistor R4. The presence of resistor R4 allows the magnetic field in relay coil 124 to collapse faster allowing the contacts to open faster. The coil 124 and electrical contacts 126 form the relay 128. When current flows through the coil 124, the contacts 126 close and may generate an arc between the contacts. When opening the contacts 126 an arc may be generated. Arcing at the contacts 126 is reduced as will be described below. The relay 128 is coupled to the load 102.

The above-mentioned circuit portion, i.e., the electromechanical relay 128 is optically isolated from the output 1. However, should optical isolation not be necessary, a switching device, such as a transistor 140, may be used together with resistors R5, R6 and R7. Resistor R5 is coupled to the power supply and the base of the switching device 140. The emitter of the switching device 140 is coupled to the power supply 50. Resistor R6 is coupled between the base and output 1. Resistor R7 is coupled between the collector of switch 140 and the base of switching device 120. A signal at output 1 allows current to flow through the switching device 140 through resistors R5, R6, and R7. Thus, in an isolated configuration, the light-emitting diode 116 and the phototransistor 118 may be eliminated. Likewise, in a non-isolated version, resistors R5, R6 and R7, together with R3 and R6, may be used.

The solid-state control portion 112 may include a solid-state device such as a triac 150. The triac 150 is controlled by output 2. In an optically-isolated version, an optical isolation circuit 152 may be used. The optical isolation circuit 152 may include a light-emitting diode 154 and a photo-triac 156. In response to the output signal, output 2, the light-emitting diode 154 conducts current through resistors R8 and R9. Light generated from the light-emitting diode 154 causes current to flow through the photo-triac 156 when certain thresholds have been achieved. Current then flows through resistors R10, R11 and R12. Resistors R10 and R11 are coupled in series between the triac, including the node N1. The output of the optical triac 156 is used as an input to gate 160 of the triac 150. The triac 150 is coupled between node N1 and node N2. The resistor R12 is coupled between the optical triac 156 or gate 160, and node N2. If optical isolation is not required, the optical isolator 152 may be replaced by a transistor or other switching device.

By controlling the output signals, output 1 and output 2, the timing and duration of the operation of the electromechanical relay 128 and the solid state device 150 may be controlled. To reduce the arc at the contacts 126 during opening and closing of the contact 126, it is desirable to place the solid state device 150 into a conducting state. This provides a low voltage drop through the contacts 126 at that time. After the electrical contacts 126 have been closed, the solid state device is opened or placed in a non-conducting state and, thus, the majority or all of the current flows through the contacts 126. This reduces the power consumption of the solid state, triac device 150 and the requirements for an expensive heat sink.

A fuse 170 disposed between node N1 and the triac 150 provides failsafe operation in the event of a failure of the triac 150. Should the triac 150 fail, the fuse 170 would open.

Figure 3:
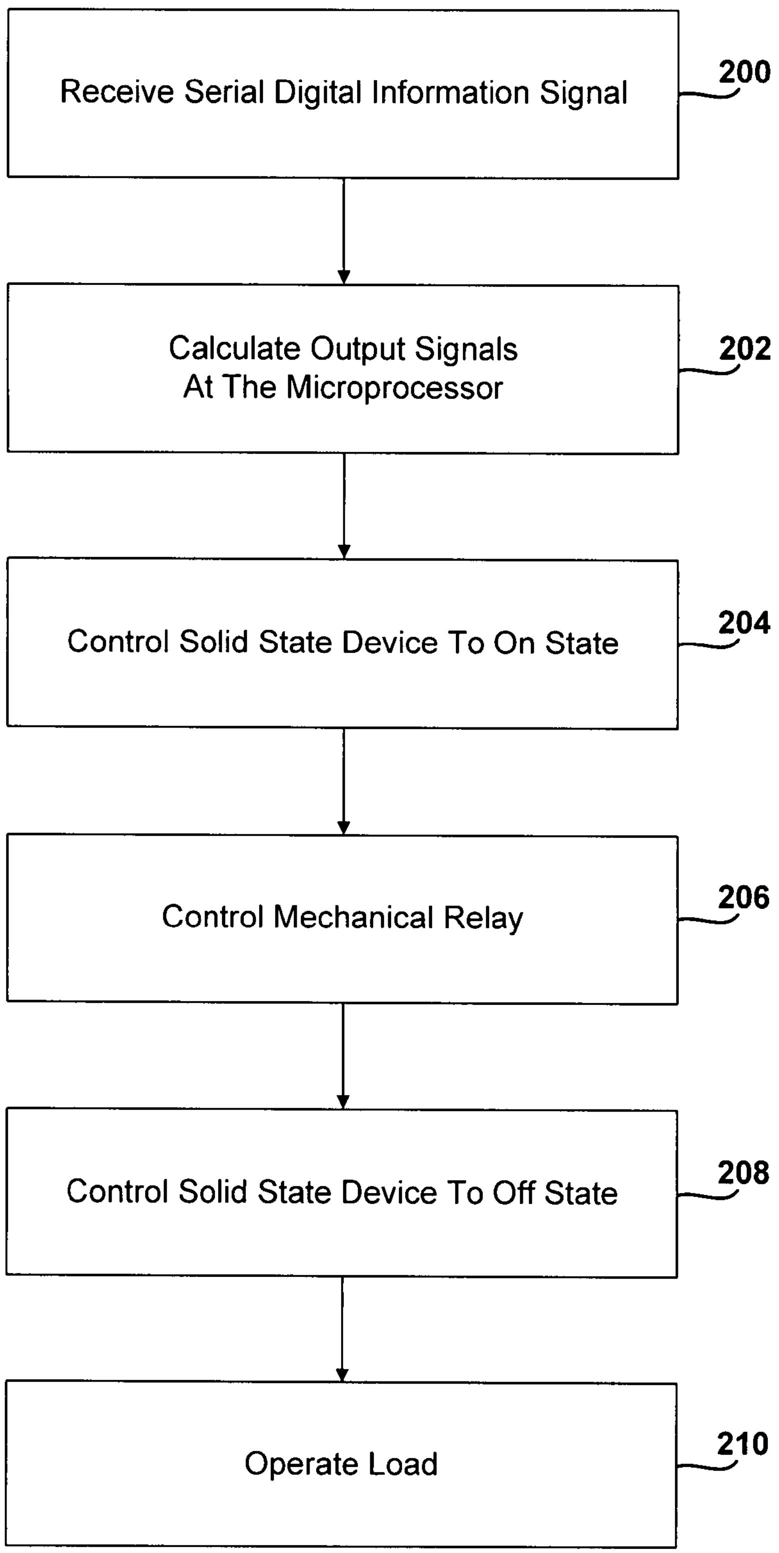
FIG. 3 is a flowchart illustrating a method for operating the invention.

Referring now to FIG. 3, a method for operating the circuit is illustrated. In step 200, a serial digital information signal is received at the microprocessor 12 of FIG. 1. The signal may comprise various types of signals from a supervisory microprocessor 30 or other external circuitry communicating through the serial communication link 20. The microprocessor 12 calculates an output signal based upon the serial digital information signal. Various types of control may be performed by the microprocessor by controlling the output signals. For example, over time it may be desirable to change the relationship of the output signal 1 to output signal 2 to compensate for wear or changing environmental conditions. Various control types may include the pulse width duty cycle or other power shaping of power from the power supply 104 being conducted to the load 102. Information signals may be used to select algorithms or provide inputs to various parameters of the system. The information may be "analog" in nature. That is, certain voltages, duty cycles, conduction times or other information may be serially communicated to the microprocessor.

In step 202, the microprocessor calculates output signals. The output signals may have a relationship so that the timing and duration of the various signals provide arc suppression at the contacts of the mechanical relay. As mentioned above, it is desirable to energize the solid state device prior to the closing of the contacts at the mechanical relay. In step 204, the solid state device may be controlled to the on or conducting state. As mentioned above, it is preferable that the solid state device be conducting prior to closing the mechanical contacts as well as prior to opening the mechanical contacts to reduce the arc at the contacting of the electro-mechanical relay. In step 206, the mechanical relay is opened or closed in response to the control signal. In step 208 the solid state device is controlled to an off or non-conducting state. By closing the mechanical relay, the load, such as a high power load, may be operated or energized in step 210.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A control circuit comprising:

a serial communication link communicating a serial digital information signal therethrough;

a microprocessor having a serial input communicating with the serial communication link and generating a control output signal in response to the serial digital information signal;

a supervisory microprocessor communicating with the microprocessor through the serial communication link; and an arc suppression circuit having an electrical contact and operating in response to the control output signal to reduce an arc at the electrical contact.

2. A control circuit as recited in claim 1 wherein the serial communication link comprises a two way serial communication link.

3. A control circuit as recited in claim 2 wherein the microprocessor communicates a status signal through the two way serial communication link.

4. A control circuit as recited in claim 1 wherein the serial communication link comprises a one way communication link.

5. A control circuit as recited in claim 1 wherein the serial communication link comprises an asynchronous communication link.

6. A control circuit as recited in claim 1 wherein the serial communication link comprises a synchronous communication link.

7. A control circuit as recited in claim 1 wherein the serial communication link is coupled to an interface and the serial digital information signal is received through the interface.

8. A control circuit as recited in claim 7 wherein the interface is disposed within the microprocessor.

9. A control circuit as recited in claim 8 wherein the interface comprises a universal asynchronous receiver transmitter (UART) and the serial digital information signal is received through the UART.

10. A control circuit as recited in claim 8 wherein the interface comprises a serial peripheral interface (SPI) and the serial digital information signal is received through the SPI.

11. A control circuit as recited in claim 8 wherein the interface comprises an inter-integrated circuit ($I^2C$) interface and the serial digital information signal is received through the $I^2C$ interface.

12. A control circuit as recited in claim 8 wherein the interface comprises an Ethernet interface and the serial digital information signal is received through the Ethernet interface.

13. A control circuit as recited in claim 1 wherein the serial digital information signal comprises a parameter signal.

14. A control circuit as recited in claim 1 wherein the serial digital information signal comprises an algorithm selecting signal.

15. A control circuit as recited in claim 1 wherein the serial digital information signal comprises a state signal corresponding to a desired state of the arc suppression circuit.

16. A control circuit as recited in claim 1 wherein the control output signal comprises a first output signal and a second output signal.

17. A control circuit as recited in claim 16 wherein the arc suppression circuit comprises a mechanical relay portion and a solid state control portion.

18. A control circuit as recited in claim 17 wherein the first output signal controls the mechanical relay control portion and the second output signal controls the solid state control portion.

19. A control circuit as recited in claim 17 wherein the first output signal and the second output signal provide coordinated operation of the arc suppression circuit to reduce the arc at the electrical contact.

20. A control circuit as recited in claim 19 wherein the first output signal and the second output signal control a timing of the solid state control portion to be conducting when the electrical contact of the mechanical relay portion is opened or closed.

21. A control circuit as recited in claim 17 wherein the first output signal is electrically isolated from a mechanical relay within the mechanical relay portion.

22. A control circuit as recited in claim 17 wherein the first output signal is electrically isolated from a mechanical relay within the mechanical relay portion with a light emitting diode and a phototransistor.

23. A control circuit as recited in claim 17 wherein the second output signal is electrically isolated from a solid state device within the solid state control portion.

24. A control circuit as recited in claim 17 wherein the second output signal is electrically isolated from a solid state device within the solid state control portion with a phototriac.

25. A control circuit as recited in claim 1 further comprising an isolation circuit disposed within the serial communication link.

26. A control circuit as recited in claim 25 wherein the isolation circuit comprises a dual channel digital isolator.

27. A control circuit as recited in claim 1 wherein the microprocessor generates a serial output signal through the serial communication link.

28. A control circuit as recited in claim 27 wherein the serial output signal comprises an error signal.

29. A control circuit as recited in claim 27 wherein the serial output signal comprises a status signal.

30. A control circuit as recited in claim 27 wherein the serial output signal comprises a status signal corresponding to the status of the arc suppression circuit.

31. A method of operating an arc suppression circuit comprising:

receiving a serial digital information signal through a serial communication link;

generating a control output signal in response to the serial digital information signal;

controlling the arc suppression circuit having an electrical contact with the control output to reduce an arc at the electrical contact; and generating a control output signal comprises generating the control output signal at a microprocessor and further comprising communicating between the microprocessor and a supervisory microprocessor through the serial communication link.

32. A method as recited in claim 31 wherein the serial communication link comprises a two way serial communication link.

33. A method as recited in claim 32 further comprising communicating a status signal through the two way serial communication link.

34. A method as recited in claim 31 wherein the serial communication link comprises a one way communication link.

35. A method as recited in claim 31 wherein the serial communication link comprises an asynchronous communication link.

36. A method as recited in claim 31 wherein the serial communication link comprises a synchronous communication link.

37. A method as recited in claim 31 further comprising coupling the serial communication link to an interface and the serial digital information signal is received through the interface.

38. A method as recited in claim 37 wherein coupling the serial communication link to an interface comprises coupling the serial communication link to the interface within a microprocessor.

39. A method as recited in claim 37 wherein the interface comprises a universal asynchronous receiver transmitter (UART) and the serial digital information signal is received through the UART.

40. A method as recited in claim 37 wherein the interface comprises a serial peripheral interface (SPI) and the serial digital information signal is received through the SPI.

41. A method as recited in claim 37 wherein the interface comprises an inter-integrated circuit ($I^2C$) interface and the serial digital information signal is received through the $I^2C$ interface.

42. A method as recited in claim 37 wherein the interface comprises an Ethernet interface and the serial digital information signal is received through the Ethernet interface.

43. A method as recited in claim 31 wherein the serial digital information signal comprises a parameter signal.

44. A method as recited in claim 31 wherein the serial digital information signal comprises an algorithm selecting signal.

45. A method as recited in claim 31 wherein the serial digital information signal comprises a state signal corresponding to a desired state of the arc suppression circuit.

46. A method as recited in claim 45 further comprising electrically isolating the second output signal from a solid state device within the solid state control portion with a photo-triac.

47. A method as recited in claim 31 wherein generating a control output signal comprises generating a first output signal and a second output signal.

48. A method as recited in claim 47 wherein the arc suppression circuit comprises a mechanical relay control portion and a solid state control portion.

49. A method as recited in claim 48 further comprising controlling the mechanical relay control portion with the first output signal and controlling the solid state control portion with second output signal.

50. A method as recited in claim 48 wherein controlling the arc suppression circuit comprises providing coordinated operation of the arc suppression circuit to reduce the arc at the electrical contact with the first output signal and the second output signal.

51. A method as recited in claim 50 controlling a timing of the solid state control portion to be conducting when the electrical contact of the mechanical relay control portion is opened or closed with the first output signal and the second output signal.

52. A method as recited in claim 48 further comprising electrically isolating the first output signal from a mechanical relay within the mechanical relay control portion.

53. A method as recited in claim 48 further comprising electrically isolating the first output signal from a mechanical relay within the mechanical relay control portion with a light emitting diode and a phototransistor.

54. A method as recited in claim 48 further comprising electrically isolating the second output signal from a solid state device within the solid state control portion.

55. A method as recited in claim 31 further comprising isolating the microprocessor and the supervisory microprocessor using an isolation circuit disposed within the serial communication link.

56. A method as recited in claim 55 wherein the isolation circuit comprises a dual channel digital isolator.

57. A method as recited in claim 31 further comprising generating a serial output signal at the microprocessor through the serial communication link.

58. A method as recited in claim 57 wherein the serial output signal comprises an error signal.

59. A method as recited in claim 57 wherein the serial output signal comprises a status signal.

60. A method as recited in claim 57 wherein the serial output signal comprises a status signal corresponding to the status of the arc suppression circuit.

* * * * *